(12) United States Patent
Barker et al.

(10) Patent No.: US 7,008,566 B2
(45) Date of Patent: Mar. 7, 2006

(54) OLIGO PHOSPHATE-BASED ELECTRODE ACTIVE MATERIALS AND METHODS OF MAKING SAME

(75) Inventors: Jeremy Barker, Oxfordshire (GB); M. Yazid Saidi, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 131 days.

(21) Appl. No.: 10/409,849

(22) Filed: Apr. 8, 2003

(65) Prior Publication Data

US 2004/0206938 A1    Oct. 21, 2004

(51) Int. Cl.
*H01M 4/58* (2006.01)
*C01B 25/37* (2006.01)
*C01B 25/26* (2006.01)

(52) U.S. Cl. ............................ 252/518.1; 252/519.1; 423/306; 423/312; 423/324; 423/331; 423/332; 429/218.1; 429/221; 429/224; 429/231

(58) Field of Classification Search ............ 252/518.1, 252/519.1; 423/306, 312, 324, 332; 429/218.1, 429/221, 224, 231
See application file for complete search history.

(56) References Cited

U.S. PATENT DOCUMENTS

| 6,136,472 A | * | 10/2000 | Barker et al. ............ 429/218.1 |
| 2002/0195591 A1 | | 12/2002 | Ravet et al. |
| 2003/0064287 A1 | | 4/2003 | Masquelier et al. |
| 2004/0005265 A1 | | 1/2004 | Chiang et al. |

FOREIGN PATENT DOCUMENTS

CA    2200998    *    9/1998

OTHER PUBLICATIONS lirts Vitioo (Girts Vitins), "Synthesis, Structure, Conductivity and Electrode Properties for some Souble Diphosphates, Silicates and Lithium Manganese Oxides," Thesis, 1999, Univ. of Latvia, Latvia.*

Padhi et al, "Effectr of Structure on the Fe3+/Fe2+ Redox Couple," J. Electrochem. Soc., 1997, 144(5), 1609-1613.*
Durif, "Oligophosphates, Crystal Chemistry of Condensed Phosphates," Plenum Press, New York, ISBN 0-306-44878-5, 1995, Chapter-2.*
Lutsko, "Ion Exchange and Sorption Processes as Methods of Synthesis of Double Phosphates and Intercalated Compounds," Phosphorus, Sulfur, and Silicon and Related Elements, 1990, 51/52, pp 97-100.*
Chung et al, "Electronically conductive phospho-olivines as lithium storage electrodes", Nature-Materials, 2002, 1, pp123-128.*
Wurm et al, "Lithium Insertion/Extraction into/from LiMX2O7 Compositions (M=Fe, V; X=P, As) prepared via a Solution Method," Chem. Mater 2002, 14, pp 2701-2710.*
Lutsko, "Ion Exchange and Sorption Processes as Methods of Synthesis of Double Phosphates and Intercalated Compounds" Phosphorous, Sulfur Silicon Relat. Elem., 51-52(1-4), 97-100 (1990).
Durif, Chapter 2: Oligophosphates, Crystal Chemistry of Condensed Phosphates, Plenum Press-New York, ISBN 0-306-44878-5 (1995).
Padhi et al., "Effect of Structure on the Redox Couples in Iron Phosphates" ECS Meeting Abstracts, 96-2, pp. 174-175 (1996).
Padhi et al., "Effect of Structure on the $Fe^{3+}/Fe^{2+}$ Redox Couple in Iron Phosphates" J. Electrochem. Soc., 144(5), 1609-1613 (1997).
International Search Report for PCT/US04/09207 dated Oct. 8, 2004.

* cited by examiner

*Primary Examiner*—Mark Kopec
*Assistant Examiner*—Kallambella Vijayakumar
(74) *Attorney, Agent, or Firm*—Michael D. Ross; Roger A. Williams; Cynthia S. Kovacevic

(57) ABSTRACT

The invention provides an electrochemical cell which includes a first electrode and a second electrode which is a counter electrode to said first electrode, and an electrolyte material interposed there between. The first electrode includes an active material having an alkali metal-containing oligo phosphate-based electrode active material.

26 Claims, No Drawings

OLIGO PHOSPHATE-BASED ELECTRODE ACTIVE MATERIALS AND METHODS OF MAKING SAME

FIELD OF THE INVENTION

This invention relates to oligo phosphate-based materials usable as electrode active materials, methods for making such materials, and electrochemical cells employing such materials.

BACKGROUND OF THE INVENTION

A battery consists of one or more electrochemical cells, wherein each cell typically includes a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

Such batteries generally include an electrochemically active material having a crystal lattice structure or framework from which ions can be extracted and subsequently reinserted, and/or permit ions to be inserted or intercalated and subsequently extracted.

In general, positive electrode active materials should exhibit a high free energy of reaction with the cation (e.g. $Li^+$, $Na^+$, and the like), be able to release and insert a large quantity of cations, maintain its lattice structure upon insertion and extraction of cations, allow rapid diffusion of cations, afford good electrical conductivity, be not significantly soluble in the electrolyte system of the battery, and be readily and economically produced.

Unfortunately, many existing electrode materials are not economical to produce, afford insufficient voltage, have insufficient charge capacity, or lose their ability to be recharged over multiple cycles. Therefore, there is a current need for an electrode active material that exhibits greater charge capacity, is economical to produce, affords sufficient voltage, and retains capacity over multiple cycles.

SUMMARY OF THE INVENTION

The invention provides novel alkali-metal containing oligo phosphate electrode active materials represented by the general nominal formula, $$A_aM_bX_cO_{(3c+1)},$$

wherein:
 (a) A is at least one alkali metal, and $0 < a \leq 6$;
 (b) M is at least one redox active element, wherein $1 \leq b \leq 4$;
 (c) X is selected from the group consisting of P, As, Sb, Si, Ge, V, S, and mixtures thereof; and
 (d) $2 \leq c \leq 5$;

wherein A, M, X, a, b and c are selected so as to maintain electroneutrality of the material.

This invention also provides electrodes which utilize the electrode active material of this invention. Also provided are batteries that include a first electrode having an electrode active material of this invention; a second electrode having a compatible active material; and an electrolyte. In one embodiment, the novel electrode material of this invention is used as a positive electrode (cathode) active material, reversibly cycling alkali metal ions with a compatible negative electrode (anode) active material.

DESCRIPTION OF THE INVENTION

It has been found that the novel electrode materials, electrodes, and batteries of this invention afford benefits over such materials and devices among those known in the art. Such benefits include one or more of increased capacity, enhanced ionic and electrical conductivity, enhanced cycling capability, enhanced reversibility, and reduced costs. Specific benefits and embodiments of the present invention are apparent from the detailed description set forth herein below. It should be understood, however, that the detailed description and specific examples, while indicating embodiments among those preferred, are intended for purposes of illustration only and are not intended to limited the scope of the invention.

The present invention provides electrode active materials for use in an electricity-producing electrochemical cell. Each electrochemical cell includes a positive electrode, a negative electrode, and an electrolyte in ion-transfer communication with both the positive and the negative electrode for transferring ionic charge carriers there between. A "battery" refers to a device having one or more electricity-producing electrochemical cells. Two or more electrochemical cells may be combined, or "stacked," so as to create a multi-cell battery.

The electrode active materials of this invention may be used in the negative electrode, the positive electrode, or both. Preferably, the active materials of this invention are used in the positive electrode. As used herein, the terms "negative electrode" and "positive electrode" refer to the electrodes at which oxidation and reduction occur, respectively, during battery discharge; during charging of the battery, the sites of oxidation and reduction are reversed.

Electrode Active Materials:

The present invention provides oligo phosphate-based electrode active materials (herein "electrode active materials"). Such electrode active materials are represented by the general nominal formula (I):

$$A_aM_bX_cO_{(3c+1)}. \quad (I)$$

The term "nominal formula" refers to the fact that the relative proportion of species (e.g. A, M, X and O) may vary slightly on the order of 2 percent to 5 percent, or more typically, 1 percent to 3 percent.

A of general formula (I) is an alkali metal or a mixture of alkali metals. In one embodiment, A is selected from the group consisting of Li (Lithium), Na (Sodium), K (Potassium), and mixtures thereof. A may be mixture of Li with Na, a mixture of Li with K, or a mixture of Li, Na and K. In another embodiment, A is Na, or a mixture of Na with K. In one preferred embodiment, A is Li.

As used herein, the recitation of a genus of elements, materials or other components, from which an individual component or mixture of components can be selected, is intended to include all possible sub-generic combinations of the listed components, and mixtures thereof. In addition, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

A sufficient quantity of alkali metal (A) should be present so as to allow all of the "redox active" elements of M (as defined herein below) to undergo oxidation/reduction. In one embodiment, $0 < a \leq 6$. In another embodiment, $1 \leq a \leq 5$. Unless otherwise specified, a variable described herein algebraically as equal to ("="), less than or equal to ("$\leq$"), or greater than or equal to ("$\geq$") a number is intended to subsume values or ranges of values about equal or functionally equivalent to said number.

Removal of alkali metal from the electrode active material is accompanied by a change in oxidation state of the redox active elements of M (or where M consist of more than one element, by a change in oxidation state of at least one of those elements). The amount of M that is available for oxidation in the electrode active material determines the amount of alkali metal that may be removed. Such concepts are, in general, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

Referring again to general formula (I), M includes at least one redox active element. As used herein, the term "redox active element" includes those elements characterized as being capable of undergoing oxidation/reduction to another oxidation state when the electrochemical cell is operating under normal operating conditions. As used herein, the term "normal operating conditions" refers to the intended voltage at which the cell is charged, which, in turn, depends on the materials used to construct the cell.

Redox active elements useful herein include those selected from Groups 4 through 11 of the Periodic Table, as well as select non-transition metals, including, without limitation, Ti (Titanium), V (Vanadium), Cr (Chromium), Mn (Manganese), Fe (Iron), Co (Cobalt), Ni (Nickel), Cu (Copper), Nb (Niobium), Mo (Molybdenum), Ru (Ruthenium), Rh (Rhodium), Pd (Palladium), Os (Osmium), Ir (Iridium), Pt (Platinum), Au (Gold), Si (Silicon), Sn (Tin), Pb (Lead), and mixtures thereof. Preferred are the first row transition series (the 4th Period of the Periodic Table), namely those selected from the group consisting of Ti, V, Cr, Mn, Fe, Co, Ni, Cu, and mixtures thereof. In one embodiment, M is selected from the group consisting of Ti, V, Cr, Mn, Fe, Co, Ni, Cu, Si, Sn, Pb, and mixtures thereof.

As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein. Also, as used herein, the word "include," and its variants, is intended to be non-limiting, such that recitation of items in a list is not to the exclusion of other like items that may also be useful in the materials, compositions, devices, and methods of this invention.

In one embodiment, $M = M'_l M''_m$, wherein $(l+m) = b$, and M' and M'' are each redox active, as defined hereinabove. In another embodiment, M' and M'' are each independently selected from the group consisting of Ti, V, Cr, Mn, Fe, Co, Ni, Cu, Mo, W, and mixtures thereof.

In yet another embodiment, at least one of M' and M'' is a non-redox active element. As referred to herein, "non-redox active elements" include elements that are capable of forming stable active materials, and do not undergoing oxidation/reduction when the electrode active material is operating under normal operating conditions.

Among the non-redox active elements useful herein include, without limitation, those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (Zinc) and Cd (Cadmium); Group 13 elements, particularly B (Boron), Al (Aluminum), Ga (Gallium), In (Indium), Tl (Thallium); Group 14 elements, particularly C (Carbon) and Ge (Germanium), Group 15 elements, particularly As (Arsenic), Sb (Antimony), and Bi (Bismuth); Group 16 elements, particularly Te (Tellurium); and mixtures thereof.

As noted above, in one embodiment, $M = M'_l M''_m$, wherein $(l+m) = b$, and at least one of M' and M'' is a non-redox active element. In one embodiment, M'' is selected from the group consisting of Be, Mg, Ca, Sr, Ba, Zn, Cd, and mixtures thereof. In another embodiment, M'' is selected from the group consisting of Sc, Y, La, B, Al, Ga, In, and mixtures thereof. In yet another embodiment, M'' is selected from the group consisting of Be, Mg, Ca, Sr, Ba, Zn, Cd, and mixtures thereof.

In another embodiment of the present invention, $M = M^1_d M^2_e M^3_f$, wherein:
(a) $M^1$ is at least one redox active element;
(b) $M^2$ is at least one 2+ oxidation state non-redox active element;
(c) $M^3$ is at least one 3+ oxidation state non-redox active element; and
(d) $d > 0$, $e \geq 0, f \geq 0$, and $(d+e+f) = b$, in other words, $1 \leq (d+e+f) \leq 4$.

In one embodiment, $M^1$ is at least one transition metal from the first row transition series (the 4th Period of the Periodic Table), namely a first row transition metal selected from the group consisting of Ti, V, Cr, Mn, Fe, Co, Ni, Cu, and mixtures thereof, and $1 \leq d \leq 3$.

In one embodiment, $M^2$ is selected from the group consisting of Be, Mg, Ca, Sr, Ba, Zn, Cd, C, Ge, and mixtures thereof, and $0 \leq e \leq 2$. In another embodiment, $M^2$ is selected from the group consisting of Be, Mg, Ca, Sr, Ba, Zn, Cd, and mixtures thereof. In one embodiment, $M^3$ is selected from the group consisting of Sc, Y, La, B, Al, Ga, In, and mixtures thereof, and $0 \leq f \leq 1$.

Referring again to general formula (I), X is selected from the group consisting of P, As, Sb, Si, Ge, V, S, and mixtures thereof. Where X is a mixture of the aforementioned elements, the active materials of the present invention are represented by the following general nominal formula (II),

$$A_a M_b [X'_{c-x} X''_x] O_{(3c+1)}, \quad (II)$$

wherein:
(a) A, M, a, b, and c are as defined hereinabove;
(b) X' and X'' are each independently selected from the group consisting of P, As, Sb, Si, Ge, V, and S; and
(c) $0 \leq x \leq c$;

wherein A, M, X', X'' a, b, c and x are selected so as to maintain electroneutrality the compound.

Methods of Manufacture:

The particular starting materials employed will depend on the particular active material to be synthesized, reaction method, and desired by-products. The active materials of the present invention are synthesized by reacting at least one alkali metal-containing compound, at least one M-containing compound, and at least one $X_c O_{(3c+1)}$-containing compound, at a temperature and for a time sufficient to form the desired reaction product. As used herein, the term "containing" includes compounds which contain the particular component, or react to form the particular component so specified.

Sources of alkali metal include any of a number of alkali metal-containing salts or ionic compounds. Lithium, sodium, and potassium compounds are preferred, with lithium being particularly preferred. Preferably, the alkali metal-containing compound or source is provided in powder or particulate form. A wide range of such materials is well known in the field of inorganic chemistry. Examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of M, M', M", $M^1$, $M^2$, and $M^3$ (hereafter referred to simply as "M") include fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, and oxalates thereof. Hydrates may also be used.

Sources of the $X_cO_{(3c+1)}$ moiety are common and readily available. For example, where X is Si, useful sources of silicon include orthosilicates, pyrosilicates, cyclic silicate anions such as $(Si_3O_9)^{6-}$, $(Si_6O_{18})^{12-}$ and the like, and pyrocenes represented by the formula $[(SiO_3)^{2-}]_n$, for example $LiAl(SiO_3)_2$. Silica or $SiO_2$ may also be used. Representative arsenate compounds that may be used to prepare the active materials of the invention wherein X is As include $H_3AsO_4$ and salts of the anions $[H_2AsO_4]^-$ and $[HAsO_4]^{2-}$. Where X is Sb, antimonate can be provided by antimony-containing materials such as $Sb_2O_5$, $M^I SbO_3$ where $M^I$ is a metal having oxidation state 1+, $M^{III} SbO_4$ where $M^{III}$ is a metal having an oxidation state of 3+, and $M^{II} Sb_2O_7$ where $M^{II}$ is a metal having an oxidation state of 2+. Additional sources of antimonate include compounds such as $Li_3SbO_4$, $NH_4H_2SbO_4$, and other alkali metal and/or ammonium mixed salts of the $[SbO_4]^{3-}$ anion. Where X is S, sulfate compounds that can be used include alkali metal and transition metal sulfates and bisulfates as well as mixed metal sulfates such as $(NH_4)_2Fe(SO_4)_2$, $NH_4Fe(SO_4)_2$ and the like. Where X is Ge, a germanium containing compound such as $GeO_2$ may be used to synthesize the active material. Finally, where X is P, hydrogen ammonium phosphate, dihydrogen ammonium phosphate, and mono-, di- and tri-basic alkali metal hydrogen phosphate may be used to synthesize the active material. Hydrates of any of the above may be used, as can mixtures of the above.

A starting material may provide more than one of the components A, M, and $X_cO_{3c+1}$, as is evident in the list above. In various embodiments of the invention, starting materials are provided that combine, for example, M and the $X_cO_{3c+1}$ moiety, thus requiring only the alkali metal to be added. Combinations of starting materials providing each of the components may also be used.

In general, any anion may be combined with the A, M or the $X_cO_{3c+1}$ anion. It is preferred, however, to select starting materials with counterions that give rise to the formation of volatile by-products during the reaction. Thus, it is desirable to choose ammonium salts, carbonates, bicarbonates, oxides, hydroxides, and the like, where possible. Starting materials with these counterions tend to form volatile by-products such as water, ammonia, and carbon dioxide, which can be readily removed from the reaction mixture. Similarly, sulfur-containing anions such as sulfate, bisulfate, sulfite, bisulfite and the like tend to result in volatile sulfur oxide by-products. Nitrogen-containing anions such as nitrate and nitrite also tend to give volatile $NO_x$ by-products.

One method for preparing the active materials of the present invention is via the hydrothermal treatment of the requisite starting materials, namely at least one alkali-metal containing compound, at least one M-containing compound, at least one $X_cO_{3c+1}$-containing compound, and (optionally) one or more reducants or reducing agents. In a hydrothermal reaction, the starting materials are mixed with a small amount of a liquid (e.g. water), and heated in a pressurized vessel or bomb at a temperature that is relatively lower as compared to the temperature necessary to produce the active material in an oven at ambient pressure. Preferably, the reaction is carried out at a temperature of about 150° C. to about 450° C., under pressure, for a period of about 4 to about 48 hours, or until a reaction product forms.

Another method for synthesizing the active materials of the present invention is via a thermite reaction, wherein M (or where M includes more than one element, the oxidizable elements of M) is reduced by a granular or powdered metal present in the reaction mixture.

The active materials of the present invention can also be synthesized via a solid state reaction, with or without simultaneous oxidation or reduction of M, by heating the requisite starting materials at an elevated temperature for a given period of time, until the desired reaction product forms.

The starting materials are provided in powder or particulate form, and are mixed together by any of a variety of procedures, such as by ball milling, blending in a mortar and pestle, and the like. Thereafter the mixture of powdered starting materials may be compressed into a pellet and/or held together with a binder material (which may also serve as a source of reducing agent) to form a closely cohering reaction mixture. The reaction mixture is heated in an oven, generally at a temperature of about 300° C. or greater, until a reaction product forms.

The reaction may be carried out under reducing or oxidizing conditions. Reducing conditions may be provided by performing the reaction in a "reducing atmosphere" such as hydrogen, ammonia, carbon monoxide, methane, or mixtures thereof, or other suitable reducing gas. Alternatively or in addition thereto, the reduction may be carried out in situ by including in the reaction mixture a reducant that will participate in the reaction to reduce M, and produce by-products that will not interfere with the active material when used later in an electrode or an electrochemical cell.

In one embodiment, the reducant is elemental carbon, wherein reduction is accomplished via simultaneous oxidation of carbon to carbon monoxide and/or carbon dioxide. An excess of carbon, remaining after the reaction, is intimately mixed with the product active material and functions as a conductive constituent in the ultimate electrode formulation. Accordingly, excess carbon, on the order of 100% or greater, may be used. The presence of carbon particles in the starting materials also provides nucleation sites for the production of the product crystals.

The source of reducing carbon may also be provided by an organic material that forms a carbon-rich decomposition product, referred to herein as a "carbonaceous material," and other by-products upon heating under the conditions of the reaction. At least a portion of the organic precursor, carbonaceous material and/or by-products formed by decomposition functions as a reducant during the synthesis reaction for the active material, before, during and/or after the organic precursor undergoes thermal decomposition. Such precursors include any liquid or solid organic material (e.g. sugars and other carbohydrates, including derivatives and polymers thereof).

Although the reaction may be carried out in the presence of oxygen, the reaction is preferably conducted under an essentially non-oxidizing atmosphere so as not to interfere with the reduction reactions taking place. An essentially non-oxidizing atmosphere can be achieved through the use of a vacuum, or through the use of inert gases such as argon, nitrogen, and the like.

Preferably, the particulate starting materials are heated to a temperature below the melting point of the starting materials. The temperature should be about 300° C. or greater, and desirably about 450° C. or greater. CO and/or $CO_2$ gas evolves during the reaction. Higher temperatures favor CO formation. Some of the reactions are more desirably conducted at temperatures greater than about 600° C.; most desirably greater than about 650° C. Suitable ranges for many reactions are from about 700° C. to about 950° C.

At about 700° C. both the C→CO and the C→$CO_2$ reactions are occurring. At closer to about 600° C. the C→$CO_2$ reaction is the dominant reaction. At closer to about 800° C. the C→CO reaction is dominant. Since the reducing effect of the C→$CO_2$ reaction is greater, the result is that less carbon is needed per atomic unit of metal to be reduced.

The starting materials may be heated at ramp rates from a fraction of a degree up to about 10° C. per minute. Once the desired reaction temperature is attained, the reactants (starting materials) are held at the reaction temperature for a time sufficient for the reaction to occur. Typically the reaction is carried out for several hours at the final reaction temperature.

After the reaction is complete, the products are preferably cooled from the elevated temperature to ambient (room) temperature (i.e., about 10° C. to about 40° C.). It is also possible to quench the products to achieve a higher cooling rate, for example on the order of about 100° C./minute. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

Electrochemical Cells:

To form an electrode of an electrochemical cell, active material of the present invention is combined with other suitable materials (e.g. a polymeric binder, current collector, an electrically conductive agent such as carbon, and the like). To form an electrochemical cell, a liquid or solid electrolyte is placed in ion-transfer relationship with the above-mentioned electrode and a counter electrode. Where required, a separator element may be positioned between the electrodes. Counter electrodes, electrolyte compositions, and methods for making the same, among those useful herein, are described in U.S. Pat. No. 5,700,298, Shi et al., issued Dec. 23, 1997; U.S. Pat. No. 5,830,602, Barker et al., issued Nov. 3, 1998; U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

Electrochemical cells composed of electrodes, electrolytes and other materials, among those useful herein, are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; and U.S. Pat. No. 6,306,215, Larkin, issued Oct. 23, 2001.

The following non-limiting examples illustrate the compositions and methods of the present invention.

EXAMPLE 1

An electrode active material having the formula $Li_2FeP_2O_7$ is made as follows. The following starting materials are provided, and the reaction proceeds as follows.

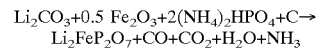

$$Li_2CO_3 + 0.5\ Fe_2O_3 + 2(NH_4)_2HPO_4 + C \rightarrow Li_2FeP_2O_7 + CO + CO_2 + H_2O + NH_3$$

The reactants are pre-mixed according to the following proportions:

| | |
|---|---|
| 0.02 moles $Li_2CO_3$ (mol. wt. = 73.88 g/mol) | 1.52 g |
| 0.01 mole $Fe_2O_3$ (159.69 g/mol) | 1.64 g |
| 0.04 moles $(NH_4)_2HPO_4$ (132.06 g/mol) | 4.71 g |
| 0.13 moles elemental carbon (12 g/mol) | 0.15 g |

The above starting materials are combined and ball milled to mix the particles. Thereafter, the particle mixture is pelletized. The pelletized mixture is heated for 8 hours at about 300° C. in an oven in an argon atmosphere. The sample is removed from the oven and cooled. Electrode active material synthesized by this method exhibited a dark red color and a medium hardness. The procedure was repeated, except that the pelletized mixture was heated for 8 hours at 600° C. The reaction product was soft and grey in color.

EXAMPLE 2

An electrode active material of the formula $Na_2CoP_2O_7$ is made as follows. The following starting materials are provided, and the reaction proceeds as follows.

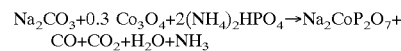

$$Na_2CO_3 + 0.3\ Co_3O_4 + 2(NH_4)_2HPO_4 \rightarrow Na_2CoP_2O_7 + CO + CO_2 + H_2O + NH_3$$

The reactants are pre-mixed according to the following proportions:

| | |
|---|---|
| 0.02 moles $Na_2CO_3$ (mol. wt. = 106.0 g/mol) | 1.90 g |
| 0.06 mole $Co_3O_4$ (240.8 g/mol) | 1.43 g |
| 0.04 moles $(NH_4)_2HPO_4$ (132.06 g/mol) | 4.73 g |

The above-noted mixture is subjected to the reaction conditions specified in Example 1 to form the $Na_2CoP_2O_7$ active material, except that the mixture is heated at a temperature of about 600° C. to about 650° C. for 8 hours. An electrode active material synthesized by this method was soft and purple in color.

EXAMPLE 3

An electrode active material of the formula $Na_2NiP_2O_7$ is made as follows. The following starting materials are provided, and the reaction proceeds as follows.

$$Na_2CO_3 + NiO + 2(NH_4)_2HPO_4 \rightarrow Na_2NiP_2O_7 + CO + CO_2 + H_2O + NH_3$$

The reactants are pre-mixed according to the following proportions:

| | |
|---|---|
| 0.02 moles $Na_2CO_3$ (mol. wt. = 106.0 g/mol) | 1.90 g |
| 0.02 mole NiO (74.71 g/mol) | 1.34 g |
| 0.04 moles $(NH_4)_2HPO_4$ (132.06 g/mol) | 4.12 g |

The above-noted mixture is subjected to the reaction conditions specified in Example 1 to form the $Na_2NiP_2O_7$ active material, except that the mixture is heated at a temperature of about 600° C. for 8 hours. An electrode active material synthesized by this method was yellow/green in color.

EXAMPLE 4

An electrode active material of the formula $Na_2MnP_2O_7$ is made as follows. The following starting materials are provided, and the reaction proceeds as follows.

$$Na_2CO_3 + MnO_2 + 2(NH_4)_2HPO_4 \rightarrow Na_2MnP_2O_7 + CO + CO_2 + H_2O + NH_3$$

The reactants are pre-mixed according to the following proportions:

| | |
|---|---|
| 0.02 moles $Na_2CO_3$ (mol. wt. = 106.0 g/mol) | 1.93 g |
| 0.02 mole $MnO_2$ (86.94 g/mol) | 1.58 g |
| 0.04 moles $(NH_4)_2HPO_4$ (132.06 g/mol) | 4.80 g |

The above-noted mixture is subjected to the reaction conditions specified in Example 1 to form the $Na_2MnP_2O_7$ active material, except that the mixture is heated at a temperature of about 500° C. for 8 hours. Electrode active material synthesized by this method was purple in color.

EXAMPLE 5

An electrode active material having the formula $Li_2Co_{0.5}Ni_{0.5}P_2O_7$ is made according to the following two step reaction. The following starting materials are provided, and the first step of the reaction proceeds as follows.

$$NiO + CoO + LiH_2HPO_4 \rightarrow LiCo_{0.5}Ni_{0.5}PO_4$$

The reactants are pre-mixed according to the following proportions:

| | |
|---|---|
| 0.01 mole NiO (74.71 g/mol) | 0.93 g |
| 0.01 mole CoO (74.93 g/mol) | 0.91 g |
| 0.02 moles $LiH_2HPO_4$ (dried) (103.9 g/mol) | 2.15 g |

The above starting materials are combined and ball milled to mix the particles. The particle mixture is pelletized. The pelletized mixture is heated for 8 hours at about 800° C. in an oven in an argon atmosphere. The sample is removed from the oven and cooled. The intermediate material synthesized by this method was hard and pink/purple in color. The intermediate material is combined with other reactants to form a second mixture, and the reaction proceeds as follows.

$$LiCo_{0.5}Ni_{0.5}PO_4 + LiH_2PO_4 \rightarrow Li_2Co_{0.5}Ni_{0.5}P_2O_7$$

The reactants are pre-mixed according to the following proportions:

| | |
|---|---|
| 0.01 mole $LiCo_{0.5}Ni_{0.5}PO_4$ (160.7 g/mol) | 1.61 g |
| 0.01 mole $LiH_2PO_4$ (103.9 g/mol) | 1.05 g |

The above-noted mixture is subjected to the reaction conditions specified in Example 1 to form the $Li_2Co_{0.5}Ni_{0.5}P_2O_7$ active material, except that the mixture is heated at a temperature of about 500° C. for 8 hours. Electrode active material synthesized by this method was hard and red in color.

EXAMPLE 6

An electrode active material having the formula $Li_2NiP_2O_7$ is made according to the following two step reaction. The following starting materials are provided, and the first step of the reaction proceeds as follows.

$$Ni_3(PO_4)_2 + 2\ Li_2CO_3 + (NH_4)_2HPO_4 \rightarrow 3\ LiNiPO_4$$

The reactants are pre-mixed according to the following proportions:

| | |
|---|---|
| 0.02 moles $Li_2CO_3$ (mol. wt. = 73.88 g/mol) | 1.15 g |
| 0.01 mole $Ni_3(PO_4)_2$ (366.01 g/mol) | 5.09 g |
| 0.01 moles $(NH_4)_2HPO_4$ (132.06 g/mol) | 1.37 g |

The above starting materials are combined and ball milled to mix the particles. The particle mixture is pelletized. The pelletized mixture is heated for 16 hours at about 800° C. in an oven in an argon atmosphere. The sample is removed from the oven and cooled. The intermediate material synthesized by this method was hard and pink/purple in color. The intermediate material is combined with other reactants to form a second mixture and the reaction proceeds as follows.

$$LiNiPO_4 + LiH_2PO_4 \rightarrow Li_2NiP_2O_7$$

The reactants are pre-mixed according to the following proportions:

| | |
|---|---|
| 0.01 mole LiNiPO$_4$ (160.6 g/mol) | 1.60 g |
| 0.01 mole LiH$_2$PO$_4$ (103.9 g/mol) | 1.05 g |

The above-noted mixture is subjected to the reaction conditions specified in Example 1 to form the Li$_2$NiP$_2$O$_7$ active material, except that the mixture is heated at a temperature of about 500° C. for 8 hours. An electrode active material synthesized by this method was hard and yellow in color.

EXAMPLE 7

An electrode active material having the formula Li$_2$VP$_2$O$_7$ is made as follows. The following starting materials are provided, and the reaction proceeds as follows.

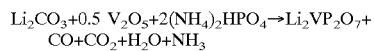
Li$_2$CO$_3$+0.5 V$_2$O$_5$+2(NH$_4$)$_2$HPO$_4$→Li$_2$VP$_2$O$_7$+ CO+CO$_2$+H$_2$O+NH$_3$ The reactants are pre-mixed according to the following proportions:

| | |
|---|---|
| 0.01 moles Li$_2$CO$_3$ (mol. wt. = 73.88 g/mol) | 0.93 g |
| 0.005 mole V$_2$O$_5$ (181.9 g/mol) | 0.84 g |
| 0.03 moles (NH$_4$)$_2$HPO$_4$ (132.06 g/mol) | 3.31 g |

The above-noted mixture is subjected to the reaction conditions specified in Example 1 to form the Li$_2$VP$_2$O$_7$ active material, except that the mixture is heated at a temperature of about 300° C. for 8 hours. Electrode active material synthesized by this method was brittle and green in color.

EXAMPLE 8

An electrode active material having the formula Li$_2$MnP$_2$O$_7$ is made as follows. The following starting materials are provided, and the reaction proceeds as follows.

Li$_2$CO$_3$+MnO$_2$+2(NH$_4$)$_2$HPO$_4$→Li$_2$MnP$_2$O$_7$+CO+ CO$_2$+H$_2$O+NH$_3$

The reactants are pre-mixed according to the following proportions:

| | |
|---|---|
| 0.02 moles Li$_2$CO$_3$ (mol. wt. = 73.88 g/mol) | 1.52 g |
| 0.02 mole MnO$_2$ (86.94 g/mol) | 1.79 g |
| 0.04 moles (NH$_4$)$_2$HPO$_4$ (132.06 g/mol) | 5.43 g |

The above-noted mixture is subjected to the reaction conditions specified in Example 1 to form the Li$_2$MnP$_2$O$_7$ active material, except that the mixture is heated at a temperature of about 500° C. for 8 hours. Electrode active material synthesized by this method was white in color.

EXAMPLE 9

An electrode active material having the formula Na$_2$CuP$_2$O$_7$ is made as follows. The following starting materials are provided, and the reaction proceeds as follows.

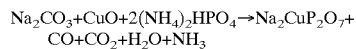
Na$_2$CO$_3$+CuO+2(NH$_4$)$_2$HPO$_4$→Na$_2$CuP$_2$O$_7$+ CO+CO$_2$+H$_2$O+NH$_3$ The reactants are pre-mixed according to the following proportions:

| | |
|---|---|
| 0.02 moles Na$_2$CO$_3$ (mol. wt. = 106.0 g/mol) | 1.87 g |
| 0.02 mole CuO (79.55 g/mol) | 1.40 g |
| 0.04 moles (NH$_4$)$_2$HPO$_4$ (132.06 g/mol) | 4.66 g |

The above-noted mixture is subjected to the reaction conditions specified in Example 1 to form the Na$_2$CuP$_2$O$_7$ active material, except that the mixture is heated at a temperature of about 600° C. for 8 hours. Electrode active material synthesized by this method was hard and blue in color.

EXAMPLE 10

An electrode active material having the formula Li$_2$CuP$_2$O$_7$ is made as follows. The following starting materials are provided, and the reaction proceeds as follows.

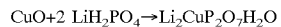
CuO+2 LiH$_2$PO$_4$→Li$_2$CuP$_2$O$_7$H$_2$O

The reactants are pre-mixed according to the following proportions:

| | |
|---|---|
| 0.02 mole CuO (79.55 g/mol) | 1.59 g |
| 0.04 moles LiH$_2$PO$_4$ (103.9 g/mol) | 4.14 g |

The above-noted mixture is subjected to the reaction conditions specified in Example 1 to form the Li$_2$CuP$_2$O$_7$ active material, except that the mixture is heated at a temperature of about 700° C. for 8 hours. Electrode active material synthesized by this method was semi hard and olive green in color.

EXAMPLE 11

An electrode active material having the formula Na$_{0.5}$Li$_{0.5}$FeP$_2$O$_7$ is made as follows. The following starting materials are provided, and the reaction proceeds as follows.

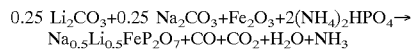
0.25 Li$_2$CO$_3$+0.25 Na$_2$CO$_3$+Fe$_2$O$_3$+2(NH$_4$)$_2$HPO$_4$→ Na$_{0.5}$Li$_{0.5}$FeP$_2$O$_7$+CO+CO$_2$+H$_2$O+NH$_3$ The reactants are pre-mixed according to the following proportions:

| | |
|---|---|
| 0.003 moles Li$_2$CO$_3$ (mol. wt. = 73.88 g/mol) | 0.230 g |
| 0.003 moles Na$_2$CO$_3$ (mol. wt. = 106.0 g/mol) | 0.330 g |
| 0.006 mole Fe$_2$O$_3$ (159.69 g/mol) | 1.000 g |
| 0.025 moles (NH$_4$)H$_2$PO$_4$ (115.03 g/mol) | 2.880 g |

The above-noted mixture is subjected to the reaction conditions specified in Example 1 to form the Na$_{0.5}$Li$_{0.5}$FeP$_2$O$_7$ active material, except that the mixture is heated at a temperature of about 700° C. for 1 hour. Electrode active material synthesized by this method was semi hard and red in color.

The examples and other embodiments described herein are exemplary and not intended to be limiting in describing the full scope of compositions and methods of this invention.

Equivalent changes, modifications and variations of specific embodiments, materials, compositions and methods may be made within the scope of the present invention, with substantially similar results.

What is claimed is:

1. A compound represented by the general nominal formula:

$$A_a M_b X_c O_{(3c+1)},$$

wherein:
(a) A is at least one alkali metal, and $0 < a \leq 6$;
(b) $M = M^1_d M^2_e M^3_f$, wherein:
   (i) $M^1$ is at least one redox active element;
   (ii) $M^2$ is at least one 2+ oxidation state non-redox active element;
   (iii) $M^3$ is at least one 3+ oxidation state non-redox active element; and
   (iv) d, e and $f > 0$; $(d+e+f) = b$; and $1 \leq b \leq 4$;
(c) X is selected from the group consisting of P, As, Sb, Si, Ge, V, S, and mixtures thereof; and
(d) $2 \leq c \leq 5$;
wherein A, $M^1$, $M^2$, $M^3$, X, a, c, d, e, and f are selected so as to maintain electroneutrality of the compound.

2. The compound of claim 1, wherein A is selected from the group consisting of Li, Na, K, and mixtures thereof.

3. The compound of claim 2, wherein A is Li.

4. The compound of claim 3, wherein $M^1$ is selected from the group consisting of Ti, V, Cr, Mn, Fe, Co, Ni, Cu, Si, Sn, Pb, and mixtures thereof.

5. The compound of claim 4, wherein $M^2$ is selected from the group consisting of Be, Mg, Ca, Sr, Ba, Zn, Cd, and mixtures thereof.

6. The compound of claim 5, wherein $M^3$ is selected from the group consisting of Sc, Y, La, B, Al, Ga, In, and mixtures thereof.

7. The compound of claim 6, wherein X is P.

8. The compound of claim 6, wherein X is a mixture of P and Si.

9. The compound of claim 1, wherein $M^1$ is selected from the group consisting of Ti, V, Cr, Mn, Fe, Co, Ni, Cu, Si, Sn, Pb, and mixtures thereof.

10. The compound of claim 1, wherein $M^2$ is selected from the group consisting of Be, Mg, Ca, Sr, Ba, Zn, Cd, and mixtures thereof.

11. The compound of claim 1, wherein $M^3$ is selected from the group consisting of Sc, Y, La, B, Al, Ga, In, and mixtures thereof.

12. The compound of claim 1, wherein X is P.

13. The compound of claim 1, wherein X is a mixture of P and Si.

14. A battery, comprising:
a first electrode comprising a compound represented by the general nominal formula:

$$A_a M_b X_c O_{(3c+1)},$$

wherein:
(a) A is at least one alkali metal, and $0 < a \leq 6$;
(b) $M = M^1_d M^2_e M^3_f$, wherein:
   (i) $M^1$ is at least one redox active element;
   (ii) $M^2$ is at least one 2+ oxidation state non-redox active element;
   (iii) $M^3$ is at least one 3+ oxidation state non-redox active element; and
   (iv) d, e and $f > 0$; $(d+e+f) = b$; and $1 \leq b \leq 4$;
(c) X is selected from the group consisting of P, As, Sb, Si, Ge, V, S, and mixtures thereof; and
(d) $2 \leq c \leq 5$; wherein A, $M^1$, $M^2$, $M^3$, X, a, c, d, e, and f are selected so as to maintain electroneutrality of the compound;
the battery further comprising a second counter electrode; and an electrolyte in ion-transfer relationship wit the first and second electrode.

15. The battery of claim 14, wherein A is selected from the group consisting of Li, Na, K, and mixtures thereof.

16. The battery of claim 15, wherein A is Li.

17. The battery of claim 16, wherein $M^1$ is selected from the group consisting of Ti, V, Cr, Mn, Fe, Co, Ni, Cu, Si, Sn, Pb, and mixtures thereof.

18. The battery of claim 17, wherein $M^2$ is selected from the group consisting of Be, Mg, Ca, Sr, Ba, Zn, Cd, and mixtures thereof.

19. The battery of claim 18, wherein $M^3$ is selected from the group consisting of Sc, Y, La, B, Al, Ga, In, and mixtures thereof.

20. The battery of claim 19, wherein X is P.

21. The battery of claim 19, wherein X is a mixture of P and Si.

22. The battery of claim 14, wherein $M^1$ is selected from the group consisting of Ti, V, Cr, Mn, Fe, Co, Ni, Cu, Si, Sn, Pb, and mixtures thereof.

23. The battery of claim 14, wherein $M^2$ is selected from the group consisting of Be, Mg, Ca, Sr, Ba, Zn, Cd, and mixtures thereof.

24. The battery of claim 14, wherein $M^3$ is selected from the group consisting of Sc, Y, La, B, Al, Ga, In, and mixtures thereof.

25. The battery of claim 14, wherein X is P.

26. The battery of claim 14, wherein X is a mixture of P and Si.

* * * * *